(No Model.)
E. W. GILES.
WATER PIPE SYSTEM.
No. 589,650.  Patented Sept. 7, 1897.
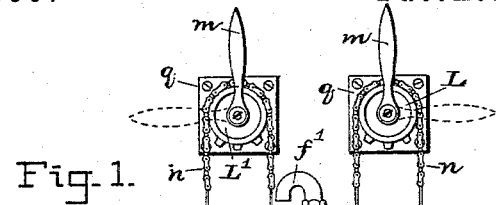
Fig. 1.
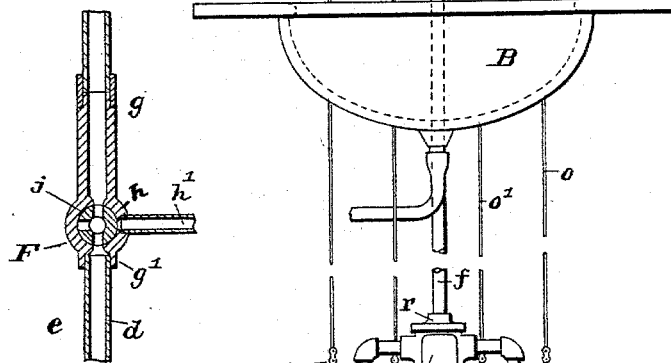
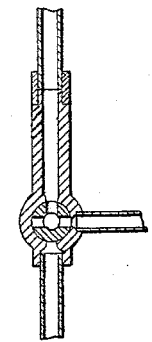
Fig. 6.
Fig. 7.
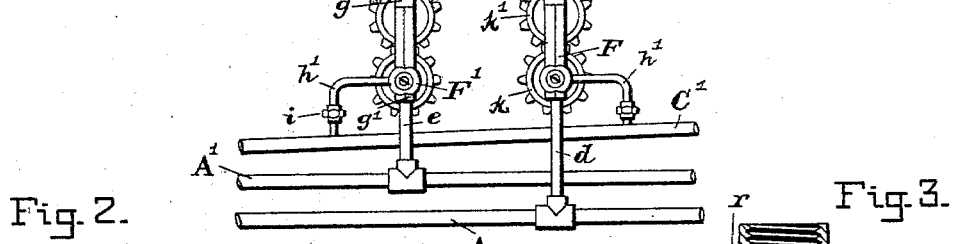
Fig. 2.
Fig. 3.
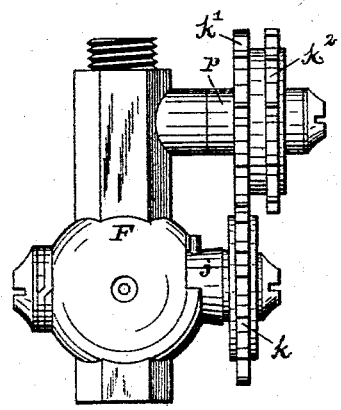
Fig. 4.
Fig. 5.
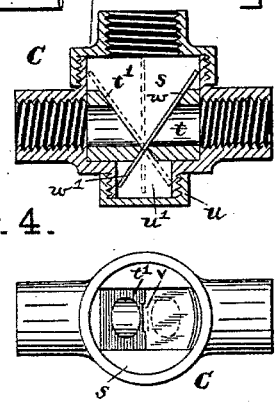
WITNESSES:
Charles B. Mann Jr.
Chapin A. Ferguson.
INVENTOR:
Edward W. Giles
By Chas. B. Mann
ATTORNEY.

UNITED STATES PATENT OFFICE.

EDWARD WALTER GILES, OF BALTIMORE, MARYLAND.

WATER-PIPE SYSTEM.

SPECIFICATION forming part of Letters Patent No. 589,650, dated September 7, 1897.

Application filed February 23, 1897. Serial No. 624,587. (No model.)

*To all whom it may concern:*

Be it known that I, EDWARD WALTER GILES, a citizen of the United States, residing at Baltimore, in the State of Maryland, have invented certain new and useful Improvements in Water-Pipe Systems for Houses, of which the following is a specification.

This invention relates to an improved dry water-pipe system for houses.

The object of the invention is to provide a novel construction and arrangement of water-supply pipes and safety cut-off valves by means of which the distributing-pipes throughout the house may be kept empty except at the time water is being drawn.

Another object is to provide means whereby one pipe will serve to deliver either hot or cold water or both hot and cold at the same time. In this system no cock or spigot is employed at the discharge-nozzle, but a controlling-valve is employed for each pipe and located in the cellar or basement of the house or any place above a few inches of lowest drainage-level, said controlling-valve serving to turn on a supply of water to the pipe which has the discharge-nozzle, to cut off the supply, and also to drain or empty the said pipe.

In order to make the invention clearly understood, I have shown one form of the same in the accompanying drawings, in which—

Figure 1 is an elevation showing a stationary washbowl, my improved pipe system for hot and cold water, with the controlling-valves, and means for operating the same.
Fig. 2 is a side view of one of the controlling-valves. Fig. 3 is a vertical section of the hot and cold water union and guide-valve. Fig. 4 is a top view of the union, the screw-cap being removed and showing the guide-valve.
Fig. 5 is a view, separately, of the guide-valve detached from the union. Fig. 6 is a sectional view of a controlling-valve. Fig. 7 is a similar view showing the valve in the closed or cut-off position, as when draining the pipe.

This pipe system is applicable to dwelling-houses, storehouses, or other structures and may extend to the first, second, third, or other upper floors of such buildings.

For the purpose of illustration the system is here shown as it may be applied to an upper floor of a house and in connection with an ordinary stationary water-bowl.

The letter A designates the main cold-water manifold, and A' the hot-water manifold, the latter leading from an ordinary circulating-boiler. (Not shown.) The washbowl B is supposed to be located in a room on the upper floor. A cold-water pipe $d$ leads from the manifold A, and in like manner a hot-water pipe $e$ leads from the manifold A'. These two pipes connect with the union C, and from this union a single pipe $f$ leads upward and terminates in an always-open discharge-nozzle $f'$ over the bowl B. No cock or spigot is employed, as is ordinarily the case, in near relation to the said discharge-nozzle. The valves which control the water in the distributing-pipes $d$ $e$ are located, preferably, in the cellar or basement or as near as possible to the lowest drainage-level of the premises, where they are secure from freezing in winter. All the pipe above said valves is drained or freed from water and kept empty except when water is being drawn. These valves are designated by the letters F F'. As the valves are both alike, except being "right" and "left" action, a description here of one of them will be sufficient.

The valve-case has two screw connections $g$ $g'$ for attachment to the pipe and a third connection $h$ for attachment of a drain-tube $h'$, which leads to the main waste-pipe C'. This drain-tube is made in two parts and has a screw-coupling $i$ for uniting the parts. The valve $j$, which is in the valve-case, is an ordinary plug-valve and has a movement equal to a quarter-turn. It contains two ways or passages, as shown, which are of a familiar construction, one serving for a supply of water and the other serving to drain the pipe empty. The plug-valve has an end projecting through the wall of the case, and a gear-wheel $k$ is fixed on said end. By turning this wheel one way or the other the valve-passages in the plug $j$ are brought into the desired position. Attached to the side of the valve-case is a laterally-projecting pivot-stud $p$, whose position is above but parallel with the plug-valve $j$. A gear-wheel $k'$ is loosely mounted on this pivot-stud and gears with the wheel $k$ on the end of the plug-valve. A sprocket-wheel $k^2$ is joined to the gear-wheel $k'$ on the stud.

Adjacent the discharge-nozzle $f'$ are two sprocket-wheels L L', pivoted to a suitable support q. Each wheel has a lever-handle m to facilitate turning. A connection is made between each of these lever sprocket-wheels and one of the valve sprocket-wheels $k^2$ on the pivot-stud.

The union C and guide-valve will be understood by reference to Figs. 3, 4, and 5. At its top the union has a screw-cap r, which covers the valve-chamber s, and the pipe f connects with this screw-cap. Two inclined valve-seats t t' are in the chamber, one confronting the other. One of these seats has a cold-water port and the other a hot-water port. A screw-cap u is on the bottom and forms a small chamber u' below the valve-chamber s. A narrow slot v opens down to said small chamber. A flap-valve w is in the chamber s and has an end w', which projects down through the narrow slot v, and by this construction the flap-valve is free to be tilted or vibrated from one inclined seat to the other to allow either cold or hot water to pass up, or if it is desired to draw both cold and hot water at the same time then the flap-valve w will stand upright, as indicated by broken lines in Fig. 3, and allow both waters to pass.

By turning the sprocket-wheel L, adjacent the always-open nozzle, the controlling-valve F of the cold-water pipe is operated. In this way cold water may be drawn to supply the bowl B, the flap-valve w tilting against the seat t' to allow the water to pass, and when the wheel is turned to cut off the flowing water communication is at once established between the nozzle-pipe f and the waste-pipe C' by way of the drain-tube h', and the said nozzle-pipe is thereby emptied. It will be seen that when draining the water in the nozzle-pipe f will be guided in its backflow by the inclined flap-valve w. Hot water will be drawn by sprocket-wheel L' and drained in the same manner. In the present instance the connection between the upper sprocket-wheels L L' and the lower ones $k^2$ comprise a short chain n about each sprocket and two wires or rods o o', connecting these chains. By the improved construction here shown of a pivot-stud p, separate from the valve-plug j, and providing intermeshing gears on the said valve-plug and pivot-stud and placing the chain sprocket-wheel $k^2$ on the stud all strain of operating the chain comes on the pivot-stud and not on the valve-plug. Consequently the latter is saved from undue wear and may be used constantly for a long time without leaking.

Any number of distributing-pipes may be attached to the manifold.

The washbowl here shown is only by way of illustration. The system is to be used for bath-tubs, water-closets, sinks, or any other special purpose. This system is also applicable to fire-plugs or sprinklers.

It will thus be seen that by my invention the water-distributing pipes throughout the house are emptied every time water is drawn, and all of said pipes are thus kept dry except at the time it is desired to draw water. This arrangement prevents any drip of water into the washbowl and prevents freezing of the pipes and avoids leakage and consequent damage to walls, plastering, and property.

Having thus described my invention, what I claim is—

1. In a system for water-distributing pipes in houses, the combination of a lower distributing-pipe for hot water and another pipe for cold water; a union with which both of said pipes connect; a single pipe leading upward from said union and terminating in an always-open discharge-nozzle; a valve in said union which opens communication between either the hot-water pipe and the discharge-nozzle or the cold-water pipe and the discharge-nozzle; a waste-water pipe; and a valve-controlled drain-tube connecting from the hot and cold water pipes, respectively, to said waste-water pipe.

2. In a system for water-distributing pipes in houses, the combination of a lower distributing-pipe for hot water and another pipe for cold water; a union with which both of said pipes connect; a single pipe leading upward from said union and terminating in an always-open discharge-nozzle; a valve in said union which opens communication between either the hot-water pipe and the discharge-nozzle or the cold-water pipe and the discharge-nozzle; a controlling-valve in each distributing-pipe; and means located adjacent said discharge-nozzle and connecting therefrom to the said controlling-valves, as set forth.

3. In a system for water-distributing pipes in houses, the combination of a lower distributing-pipe for hot water and another pipe for cold water; a union with which both of said pipes connect; a single pipe leading upward from said union and terminating in an always-open discharge-nozzle; two inclined valve-seats in said union one having a hot-water port and the other a cold-water port; a tilting or vibrating valve to close either one of said ports; a waste-water pipe; a valve-controlled drain-tube connecting from the hot and cold water pipes, respectively, to said waste-water pipe; and means located adjacent said discharge-nozzle and connecting therefrom to the said controlling-valves, as set forth.

4. In a system for water-distributing pipes in houses, the combination of a lower distributing-pipe for hot water and another pipe for cold water; a union with which both of said pipes connect; a single pipe leading upward from said union and terminating in an always-open discharge-nozzle; a valve in said union which opens communication between either the hot-water pipe and the discharge-nozzle or the cold-water pipe and the discharge-nozzle; a waste-water pipe; a controlling-valve in each distributing-pipe; a drain-tube connecting from each of said controlling-valves to the waste-water pipe; and means located adjacent said discharge-nozzle and connecting therefrom to the said controlling-valves, as set forth.

5. In a system for water-distributing pipes in houses, the combination of a distributing-pipe; an always-open discharge-nozzle; a waste-water pipe in the lower part of the building; a valve-case in said distributing-pipe; a drain-tube connecting from said valve-case to the waste-water pipe; a rotary plug-valve in said valve-case and provided with a gear-wheel; a sprocket-wheel and gear-wheel loosely mounted on said valve-case—the two gear-wheels being engaged; and an endless-chain connection from a point near the said always-open nozzle to the sprocket-wheel on the valve-case, as set forth.

In testimony whereof I affix my signature in the presence of two witnesses.

EDWARD WALTER GILES.

Witnesses:
CHAPIN A. FERGUSON,
CHARLES B. MANN, Jr.